Jan. 13, 1953 W. K. CRESON 2,625,618
HORN BUTTON SWITCH
Filed March 16, 1951

INVENTOR.
WILLIAM K. CRESON,
BY
ATTORNEYS.

Patented Jan. 13, 1953

2,625,618

UNITED STATES PATENT OFFICE 2,625,618

HORN BUTTON SWITCH

William K. Creson, La Fayette, Ind., assignor to Ross Gear & Tool Company, La Fayette, Ind., a corporation of Indiana Application March 16, 1951, Serial No. 215,922

7 Claims. (Cl. 200—59)

This invention relates to horn-button switches of the type commonly used in automobile steering wheels to control actuation of the automobile horn. It is usually desired that such a switch be capable of being closed by either rectilinear depression or rocking of the horn-button.

It is an object of my invention to provide an improved mounting for the horn button in an automobile steering wheel. Another object of the invention is to produce a mounting which will permit depression and rocking of the horn-button, which will retain the horn-button in place against all forces commonly applied to it in the operation of the automobile, but which will permit the horn-button to be removed when desired. A further object of the invention is to produce a horn-button and a mounting which can be simply and economically manufactured and readily assembled with the steering wheel.

In carrying out the invention, I provide in a central recess in the upper face of the steering wheel a base plate adapted to be secured to the steering wheel and formed with an annular series of upwardly projecting tongues. The horn-button which is adapted to be received in the aforesaid recess carries an annular series of inserts of rubber or some similar elastic material, the number of the inserts corresponding to the number of tongues on the base plate. Such inserts are provided with slots adapted to receive the tongues, and each tongue has a head somewhat larger than the slot in the associated insert. The arrangement is such that the horn-button can be mounted on the steering wheel by downward axial movement, the heads on the tongues passing through the slots in the inserts. Because the heads are larger than the slots, the slots will be elastically enlarged as the heads pass through them; and after the heads have emerged on the upper sides of the inserts, the slots will contract to their normal dimensions to hold the horn button in place.

Figure 1:
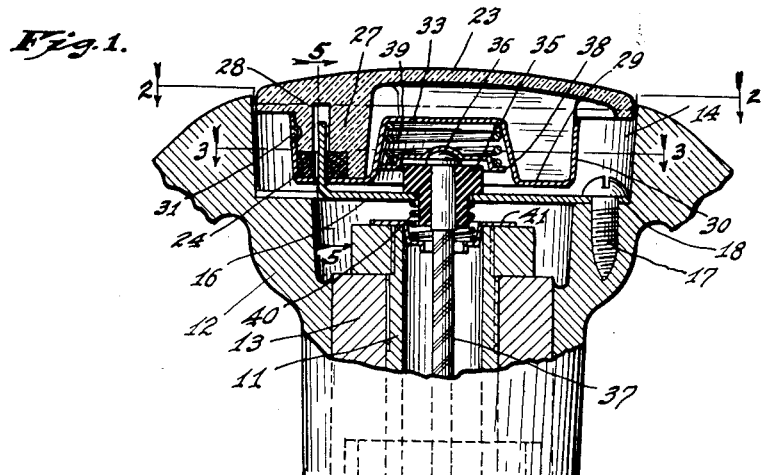
Figures 2, 3:
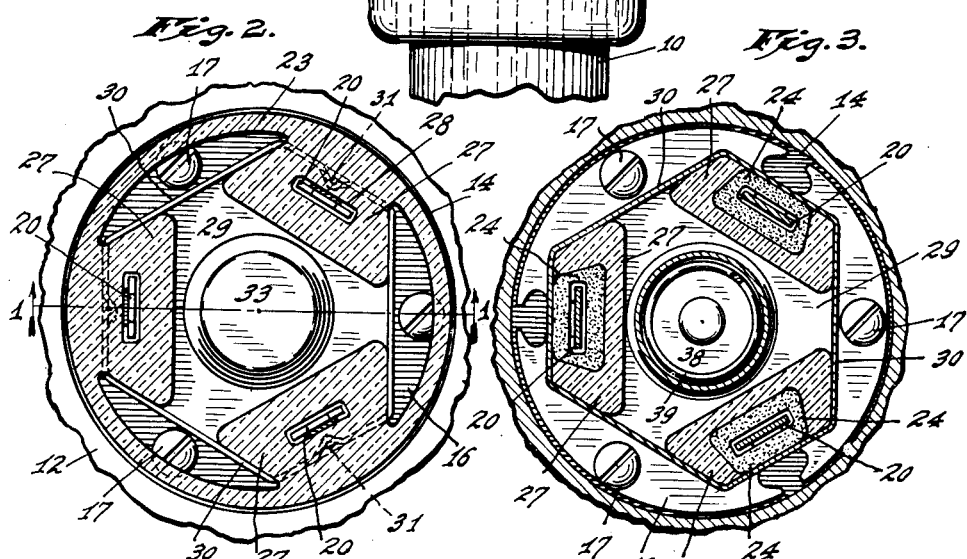
Figure 4:
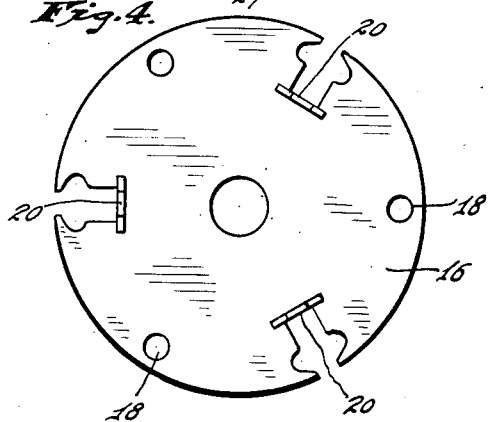
Figure 5:
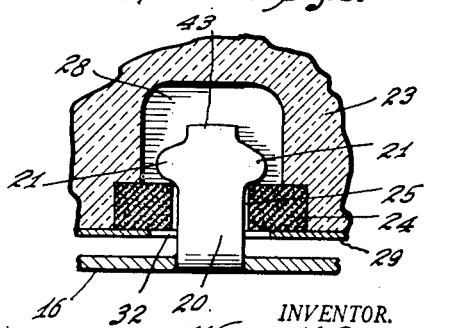

The accompanying drawing illustrates the invention: Fig. 1 is a fragmental longitudinal section through a steering-wheel hub on the lines 1—1 of Fig. 2; Figs. 2 and 3 are transverse sections on the lines 2—2 and 3—3 of Fig. 1; Fig. 4 is a plan view of the base plate; and Fig. 5 is a fragmental section on the line 5—5 of Fig. 1 illustrating the manner in which the inserts act to retain the horn-button in place.

In Fig. 1 I have indicated a conventional steering post 10 through which there extends a hollow steering shaft 11. The steering wheel 12 has rigid with it a hub-liner 13 which receives and is non-rotatably secured to the upper end of the shaft 11.

As is common practice, the upper face of the steering wheel 12 is provided with a central recess 14 within which the horn-button is to be mounted.

In practicing my invention I provide a circular base plate 16 adapted to be secured to the steering wheel at the bottom of the recess 14 as by screws 17 which extend through openings 18 in the plate 16 into the material of the steering wheel. The plate 16 is desirably of sheet metal and is formed with a series of struck-up tongues 20 each of which is enlarged near its upper end, as by the provision of radially projecting ears 21 (Fig. 5), to form a head.

The horn-button 23, which is adapted to be loosely received within the recess 14, is conveniently formed of a molded synthetic plastic material. Secured in angularly spaced relation to the bottom portion of the horn-button 23 are a series of elastic inserts 24 corresponding in number to the tongues 20. Each of the inserts 24 has a slot 25 (Figs. 3 and 5) adapted to receive one of the tongues 20. The slots 25 have at least one dimension smaller that the heads on the tongues 20. The elastic character of the inserts 24 permits such heads to pass through the slots 25 when the horn-button 23 is forced downwardly with the slots 25 aligned with the tongues; and after the heads have passed through the slots 25, such slots contact to their normal dimensions so that the inserts 24 will oppose any subsequent upper movement of the horn-button.

In the preferred arrangement, the body of the horn-button is provided with a plurality of angularly spaced, downwardly projecting bosses 27 provided at their lower ends with recesses 28 (Fig. 5) large enough to receive, with clearance, the heads on the tongues 20. At its open lower end each recess 28 is enlarged to provide a seat for one of the inserts 24, such insert being held in place by a retainer plate 29. The plate 29, which is conveniently of sheet metal, has an upwardly projecting peripheral flange 30 embracing the bosses 27 of the horn-button and may be secured to the horn-button by a staking operation performed on the flange 30 opposite each boss 27, such staking operation forming the interlocking provisions indicated at 31 in Figs. 1 and 2. The retainer plate 29, of course, has openings 32 (Fig. 5) adapted to permit passage of the tongues 20 and heads thereon, and may also have a raised center portion 33.

The base plate 16 and retainer 29 conveniently form the contacts of the horn-switch. To this end, there is centrally mounted in the base plate 16 a shouldered bushing 35 of insulating material having a central opening through which there extends a headed terminal 36 adapted to be connected to an electrical conductor 37. The upper end, or head, of the terminal 36 is rounded and supports a metal disk 38 between which and the raised central portion of the retainer 29 a compression spring 39 acts. The base plate 16 is connected to ground, conveniently through a compression spring 40 acting between the lower surface of the contact plate and a washer 41 which rests on the upper end of the steering shaft 11.

In assembling the device described, the elastic inserts 24 are seated at the open ends of the recesses 28 in the horn-button 23, the retainer 29 is applied to the horn-button, and the staking operation indicated at 31 is performed to hold the inserts and the retainer in assembled relation with the horn-button. The washer 41 and spring 40 are positioned on the upper end of the steering shaft 11, and the base plate 16 is secured to the steering wheel by the screws 17. The conductor 37 is passed through the bushing 35 and the latter is seated in a central opening in the base plate 16. With the disk 38 supported on the head of the terminal 36 and with the spring 39 on the disk, the horn-button is positioned over the steering-wheel recess 14 with the insert-slots 25 aligned with the tongues 20 and is forced downwardly until the inserts 24 pass over the ears 21 on the tongues. This operation is accompanied by compression of the spring 39, which acts thereafter to urge the horn-button upwardly and hold the upper faces of the inserts 24 against the lower edges of the ears 21, as indicated in Fig. 5. The slots 32 in the retainer 29 are large enough, and the insert-slots 25 are small enough, to prevent between the tongues 20 and the retainer 29 any such contact as would result in electrical connection of the terminal 36 to ground through the disk 38, spring 39, retainer 29, base plate 16, spring 40, and washer 41. The horn-button circuit can be closed when desired by moving the horn-button 23 to bring the retainer 29 into engagement with the base plate 16, which result can be accomplished either by tilting the horn-button or bodily depressing it.

To facilitate the mounting of the horn-button 23 and the entry of the tongues 20 into the insert-slots 25, each tongue may be provided above the ears 21 with a short pilot portion 43 small enough to enter the associated slot 25. For the same purpose, the upper edges of the ears 21 may slope outwardly and downwardly. The ears 21 may be adapted to permit removal of the horn-button 23 without injury to the inserts 24 by reshaping the ears 21 so that their lower edges slope inwardly and downwardly, as indicated in Fig. 5. Normally, as indicated in Fig. 1, the body of the horn-button 23 lies within the steering-wheel recess 14 so that difficulty would be encountered in applying to it the upwardly directed effort necessary to force the inserts 24 upwardly over the ears 21. Enough clearance may be provided between the periphery of the horn-button and the wall of the recess 14, however, to permit the insertion of a tool by which the horn-button can be pried upwardly and removed, when desired.

I claim as my invention:

1. In a horn-button switch, a base plate adapted to be secured at the bottom of a recess in a steering wheel, said base plate having an annular series of upwardly projecting members, a horn-button, and a plurality of inserts attached to said horn-button and aligned respectively with said members, each of said inserts having an opening receiving the aligned member, said members having above said inserts heads which are larger than the openings, said inserts being of elastic material whereby said openings may be elastically enlarged to permit passage of the heads therethrough.

2. The invention set forth in claim 1 with the addition that said horn-button is provided with downwardly opening recesses in which said inserts are received, and a retainer plate on the bottom of the horn-button holding the inserts in place, said retainer plate and base plate forming the contacts of the switch.

3. The invention set forth in claim 1 with the addition that said base plate is formed of sheet metal, said members being struck up from the plate and having laterally projecting ears constituting said heads, said ears having outwardly and downwardly sloping upper edges and downwardly and inwardly sloping lower edges to facilitate passage of the ears through the insert-openings, said tongues having above the ears pilot portions smaller than such openings.

4. The invention set forth in claim 1 with the addition that said base plate is formed of sheet metal, said members being struck up from the plate and having laterally projecting ears constituting said heads, said ears having outwardly and downwardly sloping upper edges and downwardly and inwardly sloping lower edges to facilitate passage of the ears through the insert-openings.

5. The invention set forth in claim 1 with the addition that said base plate is formed of sheet metal, said members being struck up from the plate and having laterally projecting ears constituting said heads, said ears having outwardly and downwardly sloping upper edges to facilitate passage of the ears through the insert-openings.

6. The invention set forth in claim 1 with the addition that said base plate is formed of sheet metal, said members being struck up from the plate and having laterally projecting ears constituting said heads.

7. In a horn-button switch, a base-plate element and a horn-button element, one of said elements having an annular series of members projecting toward the other and the other element having an annular series of inserts provided with openings through which the members respectively extend, the members having beyond the inserts heads which are larger than the openings and the inserts being of elastic material to permit passage of the heads through the openings.

WILLIAM K. CRESON.

REFERENCES CITED

The following references are of record in the file of this patent:

UNITED STATES PATENTS

| Number | Name | Date |
| --- | --- | --- |
| 1,967,030 | Kull | July 17, 1934 |
| 2,221,409 | Phelps et al. | Nov. 12, 1940 |